Patented Apr. 16, 1935

1,998,099

UNITED STATES PATENT OFFICE 1,998,099

SURFACE COATING

Fred K. Shankweiler, Newport, Del., assignor to Hercules Powder Company, Wilmington, Del., a corporation of Delaware No Drawing. Application May 25, 1932, Serial No. 613,562

5 Claims. (Cl. 91—68)

This invention relates to a surface coating and more particularly relates to a laminated surface coating for various materials.

The surface coating in accordance with this invention comprises a base coat including rosin, which coat may merely be a surface coat or may impregnate the body of a material to be coated as well as surface coat the material, and a thin overcoat including nitrocellulose.

The coating in accordance with this invention will be grease proof and will have the lustre and appearance of a thick nitrocellulose coating. The coating lends itself admirably to the coating of sheet material as paper, etc., and to the coating of fibre board as kraft board, carton board, etc., in connection with containers, as for example, food containers, etc.

In the practical embodiment of this invention the base coat included in the coating in accordance with this invention will, as has been indicated, include rosin, which may be either wood rosin or gum rosin, and in addition will include as a plasticizer either rubber or paraffine. The base coat, as has been indicated, may be merely a coating or it may be impregnated into the body of the material coated. Thus, for example, where paper is the material coated the base coat may be impregnated with the body of the paper and may be applied in the form of solution in any suitable solvent which may be removed, as, for example, by evaporation. Alternatively, for example, when the base coat is merely a coating, as, for example, on the coating of carton board, the base coat composition may be applied in a molten state.

The top or overcoat applied as a coating over the base coat will be relatively thin and will comprise essentially nitrocellulose which may be applied over the base coat in the form of a solution or any suitable solvent. The overcoat in addition to nitrocellulose may contain various ingredients, but desirably will be free of the gums and plasticizers ordinarily used in lacquers since, while their inclusion is not prohibited, they will tend to make the overcoat sticky.

The ingredients comprising the base coat may be included in widely varying proportions, however the most satisfactory results will be obtained with compositions comprising, for example, rosin 75–95% and rubber 5–25%, or rosin 80–99% and paraffine 1–20%. It will be noted that where paraffine is used rubber may be included also and that where impregnation is to be avoided the paraffine content of the composition will be limited to a maximum of about 5%. The base coat when applied in a molten condition may be applied at a temperature of, say, 100–300° F. by any suitable method, as by transfer from a hot roll, dipping into a pan containing the molten composition and removal of excess by means of a second hot roll or by a "doctor" blade. When the undercoat is applied in the form of a solution the solution may be, for example, a 5–40% solution in benzol, toluol, or other suitable solvent and the application may be by dipping or other desirable method.

The base coat having been applied to the material, the overcoat comprising essentially nitrocellulose as, for example, nitrocotton in solution or any well known solvent, as ethyl acetate, butyl acetate, acetone, and coating or diluent, if desired, is applied by any suitable method as, for example, by dipping, spraying, etc.

Before applying the overcoat the base coat will desirably be warmed to smooth its surface and, as will be obvious, the viscosity of the nitrocellulose solution for application to form the overcoat will be regulated as desired by control of the amount of solvent or solvent mixture and/or by the use of a nitrocellulose of desired viscosity characteristic.

As more specifically illustrative, for example, a satisfactory base coating may have the following formulæ:

Rosin _____ 85   97
Rubber _____ 15
Paraffine _____      3

A satisfactory overcoat will be formed by the application of a solution of, say, about 35% nitrocotton, having a viscosity of about ½ second, in ethyl acetate or acetone.

As will be appreciated the base coat composition will adhere to the surface of the material, as paper, carton board, etc., to which it is applied or in which it is impregnated and the overcoat will adhere to the base coat.

The coating in accordance with this invention will, as has been indicated, be grease proof and will have the lustre of a thick nitrocellulose coating. The base coat will not bleed through the overcoat and the overcoat will provide a lustrous smooth finish having substantial moisture resistance.

Materials, as, for example, paper carton board, etc., which merely coated or coated and impregnated, as described above, will be found of great advantage variously and especially in connection with the wrapping or packaging of foodstuffs.

Having now fully described my invention, what

I claim and desire to protect by Letters Patent is:

1. In combination a base having a surface, a coating formed on a surface of the base comprising a major proportion of rosin and a minor proportion of a substance from the group consisting of rubber and paraffin and a coating comprising dominatingly nitrocellulose superimposed on said first mentioned coating.

2. In combination a base having a surface, a coating formed on a surface of the base comprising rosin 75-95% and rubber 5-25% and a coating composition comprising dominatingly nitrocellulose superimposed on said first mentioned coating.

3. In combination a base having a surface, a coating formed on a surface of the base comprising rosin 80-99% and paraffin 1-20% and a coating comprising dominatingly nitrocellulose superimposed on said first mentioned coating.

4. In combination a felted material forming a base, a coating formed on a surface of the base comprising a major proportion of rosin and a minor proportion of a substance from the group consisting of rubber and paraffin and a coating comprising dominatingly nitrocellulose superimposed on said first mentioned coating.

5. In combination a paper forming a base, a coating formed on a surface of the base comprising a major proportion of rosin and a minor proportion of a substance from the group consisting of rubber and paraffin and a coating comprising dominatingly nitrocellulose superimposed on said first mentioned coating.

FRED K. SHANKWEILER.